C. P. T. La ROCHE.
Sad-Iron.
No. 222,355. Patented Dec. 9, 1879.
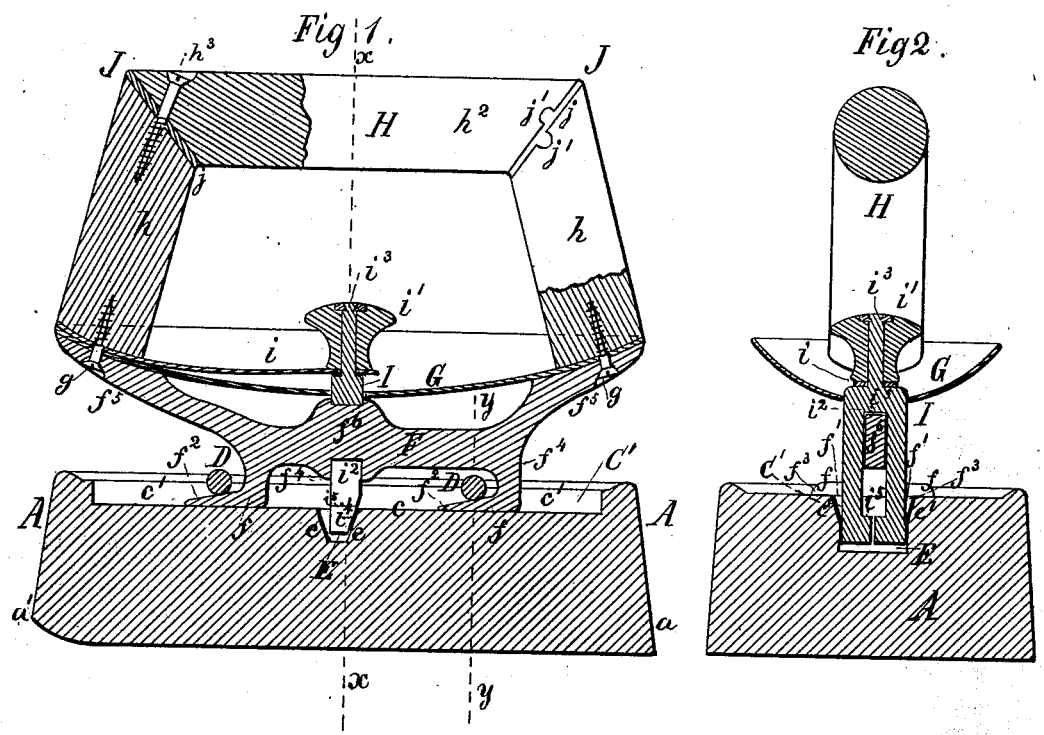
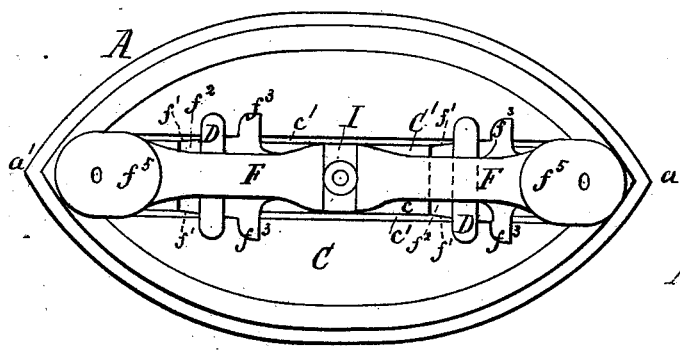
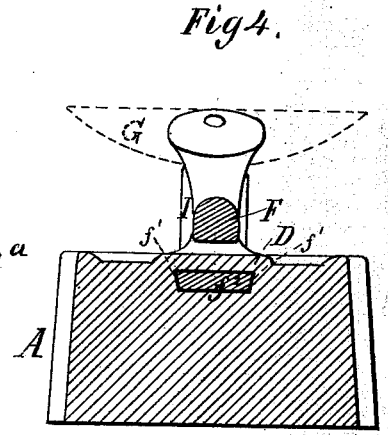
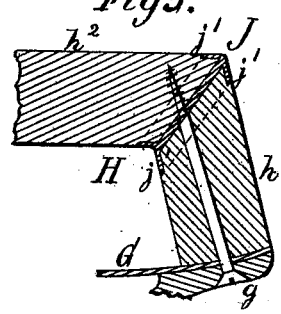
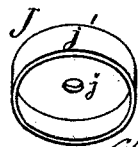
Witnesses:
J. P. Th. Lang.
Robert L. Fenwick.
Inventor:
Charles P. T. La Roche
by
Fenwick & Lawrence

UNITED STATES PATENT OFFICE.

CHARLES P. T. LA ROCHE, OF LOCKPORT, NEW YORK.

IMPROVEMENT IN SAD-IRONS.

Specification forming part of Letters Patent No. 222,355, dated December 9, 1879; application filed September 5, 1879.

*To all whom it may concern:*

Be it known that I, CHARLES P. T. LA ROCHE, of Lockport, in the county of Niagara and State of New York, have invented a new and useful Improvement in Sad-Irons, which improvement is fully described in the specification and drawings hereunto annexed, in which—

Figure 1 is a vertical longitudinal section of my sad-iron, one part of the handle being shown in side elevation. Fig. 2 is a vertical transverse section of the same in the line $x\,x$ of Fig. 1. Fig. 3 is a top view of the sad-iron, the handle, shield, and the knob being removed. Fig. 4 is a vertical transverse section in the line $y\,y$ of Fig. 1, the shield being shown in dotted lines and the handle removed. Fig. 5 is a sectional detail of a modified construction of the handle. Fig. 6 is a detail view of a knee-joint socket of the same.

My invention relates to sad-irons with detachable handles.

In the annexed drawings, A represents the body or smoothing portion of the sad-iron, and H the handle; G, the heat-shield, and F the bridge by which the said parts are united. The smoothing portion of the iron is of a shape similar to those commonly used in laundries.

The nature of my invention consists, first, in the combination with a sad-iron, of a bridge-bar having upwardly and outwardly extending supporting-arms for the shield and handle to rest upon and be attached to, and also having downwardly-extending legs with feet upon them for fastening the bridge-bar and the parts upon it to a sad-iron; secondly, in the combination of a central beveled spring locking-bolt with the bridge-bar, having arms, legs, and feet, as described, and a sad-iron; and, thirdly, in the combination of the bridge-bar having arms and legs, on which latter are feet which are beveled on top and tapered transversely, a spring locking-bolt having a tapering lower end, and a sad-iron having a groove in its top of upwardly-flaring form in a transverse direction, and also having a central socket for receiving the locking-bolt, and transverse loops or bars for confining the feet of the bridge-bar, as presently described.

The iron A has two pointed ends and elliptical or curved sides, the end $a$ being flat on its under side, and the opposite end, $a'$, rounded off, as shown in Fig. 1.

In the top surface the part A is provided with a groove, $C'$, which has a horizontal base, $c$, and inclined sides $c'$. This groove does not extend over the whole length of the smoothing-iron, but terminates near the ends of the same, in order to make the smoothing-iron with a beaded finish all around, and also prevent ashes or other matter which may collect in the groove from working out and soiling the clothes being ironed.

At two suitable points equidistant from the center of the smoothing-iron two transverse loop-bars, D, are formed across the groove, and in the center of the smoothing-iron the groove is increased in depth in form of a transverse socket, E, which has two tapering sides, $e$, the taper being in the longitudinal direction of the groove.

The groove $C'$ serves as a guide and bearing for two feet, $f$, on the legs $f^4$ of the bridge-bar F. The said feet have inclined sides $f'$, which fit the groove $C'$, and their upper surfaces, $f^2$, are beveled down in the shape of a wedge, in order to be easily pushed under the loop-bars D, and they are also provided with horizontal ears or loops $f^3$, which bear on the top surface of the smoothing-iron, and thus materially contribute to the lateral steadiness of the bridge-bar and handle attached thereto.

The bridge-bar is provided with upwardly and outwardly extending arms $f^5$, to which the concave elliptic shield G and the truss-handle H and a spring, $i$, of a locking device, I, are suitably fastened by screws $g$.

The locking device I (see Fig. 2) consists of a bolt, $i^2$, with a knob, $i'$, on its end, said bolt being connected to the spring $i$, as shown. The bolt is forked and has stop-shoulders $i^5$, and is made to straddle a reduced portion, $f^6$, of the bridge-bar F, so that it can be moved up and down thereon, and be guided by the thicker parts of the bar on either side of the reduced portion $f^6$.

The lower portion of the bolt $i^2$ extends into the socket E of the groove $C'$, and is beveled off at $i^4$ on one side, the bevel corresponding with the taper of the sides $e$ of the socket, against one of which sides it is made to bear by the downward force of the spring $i$ upon the bolt. The bolt $i^2$, when in the socket, does not touch the bottom thereof, nor does it enter the socket to the full extent of its movement. This is so in order that its beveled side $i^4$ may bear against one of the beveled sides $e$ of the socket, and thereby push the feet $f$ forward and tightly under the loop-bars D of the smoothing-iron.

The truss-handle H is made of three pieces of wood, $h$ $h'$ $h^2$, two of which are inclined and one horizontal. One of these pieces, $h$, joins the shield and the bridge-bar directly, and the other, $h'$, rests upon the rigid end of the spring $i$, and holds it down upon the shield and arm of the bridge-bar, while the piece $h^2$ forms the upper horizontal tie or connection. The parts $h$ $h'$ are fastened to the arms of the bar F, together with the shield G and spring $i$, by the screws $g$. Between the joints of the upper piece, $h^2$, and pieces $h$ $h'$ strengthening socket-pieces J are inserted, which consist of a web, $j$, with spur-like flanges $j'$ turned at an angle in the direction of the parts united thereby. The horizontal part $h^2$ of the handle is screwed to the inclined parts $h$ and $h'$, with the socket-pieces J between them, by means of screws $h^3$.

Instead of the spur-flanges $j'$, the web may be provided with continuous rim-flanges, as shown in Figs. 5 and 6, and the screws $g$ may be made long enough to extend entirely through the lower parts, $h$ $h'$, into the upper part, $h^2$, of the handle.

It will be seen that as the socket E, the bars D, and the bolt $i^2$ occupy central positions in respect to the smoothing-iron, the truss-handle H may be united with the smoothing-iron from either the right or left hand end, and yet always be centrally united with it, and thus the operator may, at pleasure, use the point $a$ or $a'$ as the front end of the smoothing-iron.

The knob $i'$ is placed centrally below the part $h^2$, and within reach of the operator's fingers while the hand is grasping the part $h^2$, and thus the operator need not remove her or his hand from the handle in order to lift the knob and withdraw the bolt from the socket E, but can keep the handle in hand while either detaching or attaching it.

The handle, being of wood and of pieces which form a truss, is very strong and of a shape which is convenient for the operator's manipulations in the act of ironing, and at the same time is of but trifling cost to construct, the inclined ends $h$ and $h'$ forming abutments, so to speak, against the pressure of the hand of the operator during the act of ironing.

I claim—

1. The bridge-bar F, with handle and shield attached thereto, formed with the upwardly-extending arms $f^5$ and two feet, $f$, on downwardly-extending legs $f^4$, in combination with a sad-iron having a groove in its top and two loops across the groove, substantially in the manner and for the purpose described.

2. The bridge-bar having upwardly and outwardly extending arms $f^5$, to which a shield and handle are attached, and also having two downwardly-extending legs, $f^4$, on which feet $f$ are formed and beveled, as shown, in combination with a central sliding spring-latch, beveled as described, and a sad-iron provided in its top with a groove and socket, beveled, as shown, and with transverse loops D D, substantially as and for the purpose set forth.

3. The vertically-sliding beveled spring-latch, in combination with the bridge-bar carrying shield and handle, and having two beveled feet, and the sad-iron provided with a longitudinal beveled groove, a beveled socket midway of the groove, and two loops, D D, substantially as and for the purpose herein described.

Witness my hand in the matter of my application for a patent for improvements in sad-irons this 3d day of September, 1879.

CHARLES P. T. LA ROCHE.

Witnesses:
WM. GRITMAN,
WM. K. MACKEY.